April 30, 1968  H. A. FAERBER  3,380,401
MANUFACTURE OF CONFECTIONERY
Filed Oct. 20, 1965

INVENTOR:
HANS A. FAERBER

ATTORNEYS

United States Patent Office 3,380,401
Patented Apr. 30, 1968

3,380,401
MANUFACTURE OF CONFECTIONERY
Hans Arthur Faerber, Castle Cove, New South Wales, Australia, assignor to Nid Pty., Limited, Alexandria, near Sydney, New South Wales, Australia, a corporation of Australia
Filed Oct. 20, 1965, Ser. No. 498,948
3 Claims. (Cl. 107—8)

ABSTRACT OF THE DISCLOSURE

In a confectionery moulding machine having a plurality of pumps for depositing confection substance into moulds and a plunger head grooved in its underside to receive and hold a first group of plungers associated with certain pumps for reciprocating the plungers to operate the pumps; the concept of providing one or more apertures in the underside of the plunger bar for freely receiving one or more additional pump plungers to render them inoperative by virtue of relative movement between the plunger bar and the additional pump plungers when the plunger bar is moved to reciprocate the first group of pump plungers.

---

This invention relates to confectionery moulding machines of the kind which progress a series of trays, each holding a quantity of a moulding medium defining a plurality of open-topped mould cavities, below a multi-cylinder depositor pump which fills the cavities with a settable liquid or semi-liquid substance from which the confections are made.

Such depositor pumps usually comprise a pump body defining a plurality of open topped, upright cylinders, a corresponding plurality of plungers slidable respectively in the cylinders, plunger operating means whereby the plungers are reciprocated in concert, valve devices adapted to control the flow of confection substance from a reservoir into the cylinders during the up or in-take stroke of the plungers and from the cylinders during a pre-determined part of the down or depositing stroke of the plungers, and a plurality of nozzles through which the confection substance is discharged from the cylinders into the mould cavities.

The said plunger operating means may comprise a plunger bar detachably secured to the top ends of all of the plungers and apparatus to raise and lower the plunger bar so as to effect concerted operation of the plungers. That apparatus may comprise a pair of power driven rocking levers or the like connected respectively to opposite ends of the plunger bar, but preferably such levers, or their equivalent, cause a cross-head to rise and fall in appropriate guides and the plunger bar is bolted or otherwise detachably secured to that cross-head.

The depositor pump nozzles usually project downwardly from the bottom face of a nozzle plate which is secured to the bottom of the pump body. The nozzle plate has flow channels in its upper surface putting the pump cylinders into communication with the nozzles.

The nozzle plate is detachably secured to the pump body and, in practice, several nozzle plates are made available each providing an array of nozzles which varies in the number and/or spacing of the nozzles from that of the other nozzle plates. Each nozzle plate has an array of flow paths to suit its nozzle array so that changes in the number and size of mould cavities in each tray which are likely to occur when production of one type of confectionery ceases and production of another type commences can often be accommodated simply by replacing one nozzle plate for another.

However, it frequently happens that the optimum number of nozzles, to provide for the most convenient spacing of mould cavities in each tray, does not divide evenly into the number of pump cylinders. Thus, it becomes necessary not to utilize some of the cylinders as a way of ensuring that each mould cavity is fed from the same number of cylinders and therefore receives the same (and correct) amount of confection substance.

Hitherto, such a reduction in the effective number of operational pump cylinders during changeover from one product to another has been effected by detaching the plunger bar from its lifting and lowering apparatus and removing it from the pump, then extracting the plungers from those cylinders which are to be rendered inoperative and substituting shorter or headless plungers (which are not engageable with the plunger bar) in their place and replacing the plunger bar in position.

However, it must be remembered that usually the confection substance being processed is at or near boiling temperature so that the entire pump, and in particular the plungers to be extracted are too hot to be touched by hand. Furthermore, unless the preparatory step of emptying the machine is carried out, the substitution of the plungers has to be done quickly in case the confection substance should rise in the pump and overflow, so requiring a complete cessation of operations until the parts are dismantled and cleaned. As a result there is some likelihood of the operator, working at speed under unpleasant conditions, making a mistake and substituting the wrong number or wrong array of plungers. Thus it will be apparent that the above described method of changing over from one product to another is objectionable.

An object of the present invention is to overcome or ameliorate the above indicated objectionable features by very simple means.

The invention achieves that object by the provision of replaceable plunger bars corresponding to the replaceable nozzle plates; such plunger bars being characterized in that the formations whereby the plungers are gripped or retained are absent at pre-determined locations so that the plungers corresponding to those locations are not connected to the bar. Therefore, the plunger bar may only connect to and operate the remaining or "in-use" plungers without affecting the "out-of-use" plungers.

Thus, in its simplest form, the invention may be said to provide a plunger bar, in or for a multi-cylinder confectionery moulding machine, of the kind adapted to be detachably secured to the exposed heads of a plurality of the machine's depositor pump plungers and to the machine's bar lifting and lowering apparatus to effect concerted operation of the plungers, characterized in that it has at least one clearance cavity in it into which the head of at least one of the machine's plungers may protrude when the bar is in use so rendering said one plunger inoperative.

Most usually, the plungers of the depositor pump are disposed in rows, each row extending longitudinally of the pump body. Each plunger protrudes above the pump body and has a head at its top end with a lesser diameter neck below the head. The plunger bar has a plurality of T-sectioned slots formed in its undersurface which extend longitudinally of it, there being one such slot corresponding in position to each row of plungers. Thus, the plunger bar may be slid endwise into its operative position to cause the heads of the plungers to enter the T-head portion of the slots with the necks of the plungers extending downwardly through the T-stem portion of the slots. Thus in particular embodiments of the present invention, wherein the plungers and bar slots are essentially of the form described immediately above, portions of the flanges on the underside of the plunger bar which define the stem portion of one or other of the slots are absent so that a plunger at that position is not retained in the slot as the plunger bar rises.

In some instances, the flanges for an entire slot may be missing in which event an entire row of plungers would be rendered inoperative.

Two such embodiments of the invention are described hereinafter with reference to the accompanying drawings.

Figure 1:
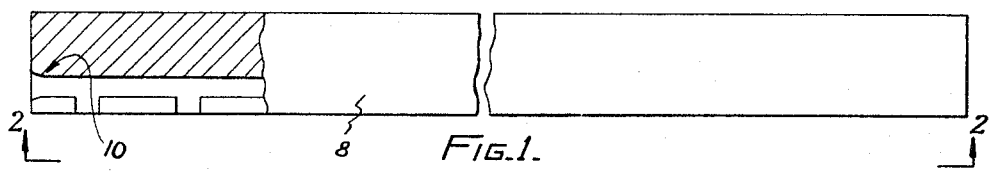
FIG. 1 is a partly cut away side elevation of a plunger bar according to one embodiment of the invention.
Figure 2:
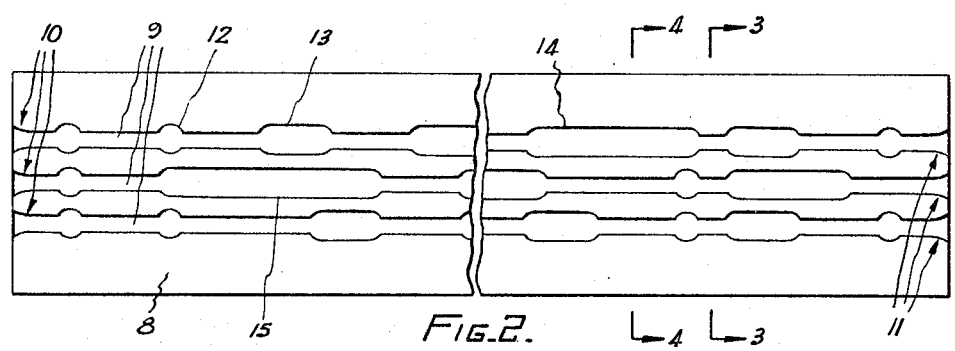
FIG. 2 is a plan view of the plunger bar of FIG. 1 when inverted.
Figure 3:
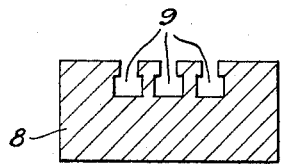
FIG. 3 is a sectional view taken on line 3—3 of FIG. 2.
Figure 4:
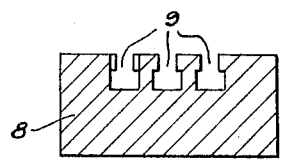
FIG. 4 is a sectional view taken on line 4—4 of FIG. 2.

The plunger bar illustrated by FIGS. 1–4 comprises a metal body 8 defining, on its underface, three longitudinally extending T-sectioned slots 9. Thus, the plunger bar is adapted for use in a confectionery machine having three rows of plungers in its depositor pump. Each such plunger customarily has an enlarged head or grooved body and the plunger bar may be slid endwise above the rows of plungers so that the plunger heads enter the enlarged portions of the slots 9.

For preference, the ends of the slots 9 are bell-mouthed as at 10 and 11 to facilitate the entry of the plunger heads into the slots. At predetermined positions, for example at 12, 13, 14 and 15 and the other illustrated in the drawings, the edge flanges defining the stem or thinner portions of the slots 9 are cut away during the manufacture of the plunger bar so that any plungers with their heads in the slots 9 at those positions are not retained as the plunger bar rises. Therefore, a predetermined array of plungers is rendered inoperative when the illustrated plunger bar is used.

Figure 5:
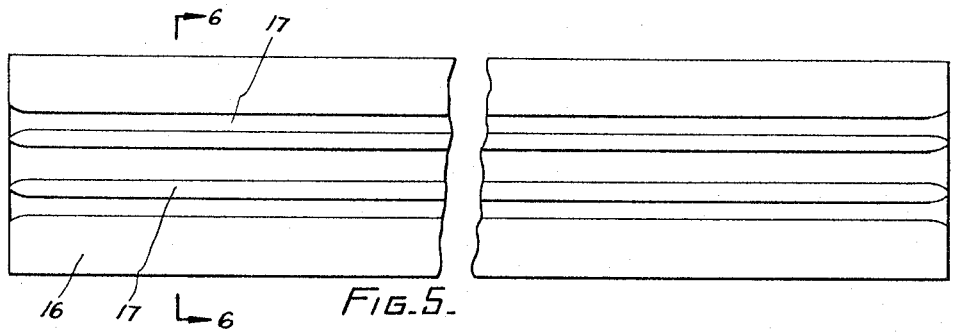
FIG. 5 is a view similar to FIG. 2 of another embodiment of the invention.
Figure 6:
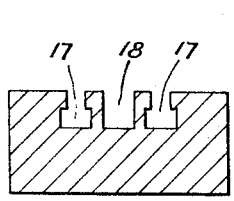
FIG. 6 is a sectional view taken on line 6—6 of FIG. 5.
Figure 7:
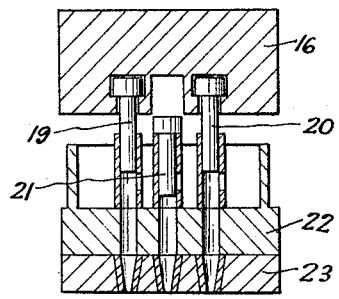
FIG. 7 is a diagrammatic cross-sectional view showing the plunger bar of FIG. 5 as disposed when in use in a confectionery machine.

The embodiment of the invention illustrated by FIGS. 5–7 is also adapted for use in a confectionery machine having three rows of plungers in its depositor pump. The plunger bar now being described is such that the whole of the centre row of plungers is rendered inoperative while all of the plungers in the outer two rows are operative.

Thus, the plunger bar comprises a body 16, two T-sectioned slots 17 formed therein and a third slot 18 in which the flanges which would otherwise have defined the stem portion of a T-sectioned slot, have been completely removed to leave a plain slot of rectangular cross-section.

FIG. 7 illustrates the plunger bar as in use and shows three plungers 19, 20 and 21 in a multicylinder pump 22 including a nozzle plate 23. It will be appreciated that the pump and nozzle plate and plungers are illustrated in a diagrammatic fashion but it will be clear from the drawing that as the plunger bar 16 reciprocates only plungers in the rows of plungers 19 and 20 reciprocate with it and the plungers in the row including plunger 21 remain stationary and do not pump.

It will be appreciated that devices for connecting the plunger bar to the plungers other than those of the above described embodiments of the invention may be used, but so long as the plunger bar is readily applied to the plungers and when so applied only grips a selected fraction of the plungers within its ambit then that plunger bar is within the scope of the present invention.

An operator may determine the depositing pattern for the pump by selecting an appropriate plunger bar according to the invention and an appropriate nozzle plate. Therefore, the risk of error is greatly reduced especially if the plunger bars and nozzle plates are provided with identifying marks enabling an operator or his supervisor rapidly to check that the desired bar and plate is in use.

What I claim is:

1. In combination with reciprocable pump plungers for pumps in a confectionery molding apparatus; a plunger bar overlying the pump plungers and having on its underside a first number of cavities receiving and retaining a first number of plungers to reciprocate them upon movement of the plunger bar, said plunger bar further having on its underside a second number of cavities overlying a second number of plungers respectively, said second number of cavities having width dimensions greater than said first number of cavities and also greater than the ends of said second number of plungers to freely receive the ends of said second number of plungers respectively without transmitting motion to said second number of plungers when the plunger bar is moved to actuate said first number of plungers, and said plunger bar being removable from said plungers to permit substitution of another plunger bar having a different arrangement of cavities corresponding to said first number of cavities and said second number of cavities whereby different groups of plungers will be rendered operative and inoperative upon movement of the substituted plunger bar.

2. In combination with reciprocable pump plungers for pumps in a confectionery molding apparatus; a plunger bar overlying the pump plungers and having means connected to a first number of plungers to reciprocate them upon movement of the plunger bar, said plunger bar further having a number of apertures overlying a second number of plungers and dimensioned to receive them without transmitting operative motion thereto while the said first number of plungers are reciprocated by the bar, said first number of plungers having flanged head portions, said means including grooves in the bar having a generally T-shaped cross-section receiving said flanged head portions, certain of said grooves being in interalignment, and said apertures being located between the aligned grooves and having a generally rectangular cross-section including a minimum width equal to that of the flanged head portions of the plungers.

3. In confectionery molding apparatus comprising a plurality of pumps including associated plungers for depositing confection substance into a mold, and a movable plunger bar having a number of cavities in its underside receiving and retaining the ends of said plungers for reciprocating the plungers upon movement of the plunger bar; a method of rendering inoperative a predetermined certain number of plungers and consequently their associated pumps comprising, the steps of removing the plunger bar from the plungers while maintaining the plungers and their pumps intact and substituting another plunger bar having in its underside a first group of cavities receiving and retaining the ends of a first group of plungers to actuate them upon movement of the plunger bar, said substituted bar further having in its underside a certain number of cavities overlying and dimensioned to freely receive said certain number of plungers without transmitting any operative motion thereto and thereby render them inoperable when the substituted plunger bar is moved to actuate the said first group of plungers.

References Cited

UNITED STATES PATENTS

| | | | |
|---|---|---|---|
| 712,649 | 11/1902 | Carlson | 107—27 |
| 2,597,175 | 5/1952 | Perkins | 107—29 |
| 2,699,708 | 1/1955 | Fotsch | 269—296 X |

FOREIGN PATENTS 825,081  12/1951  Germany.

WALTER A. SCHEEL, *Primary Examiner.*

A. S. HENDERSON, *Assistant Examiner.*